Figure 1:
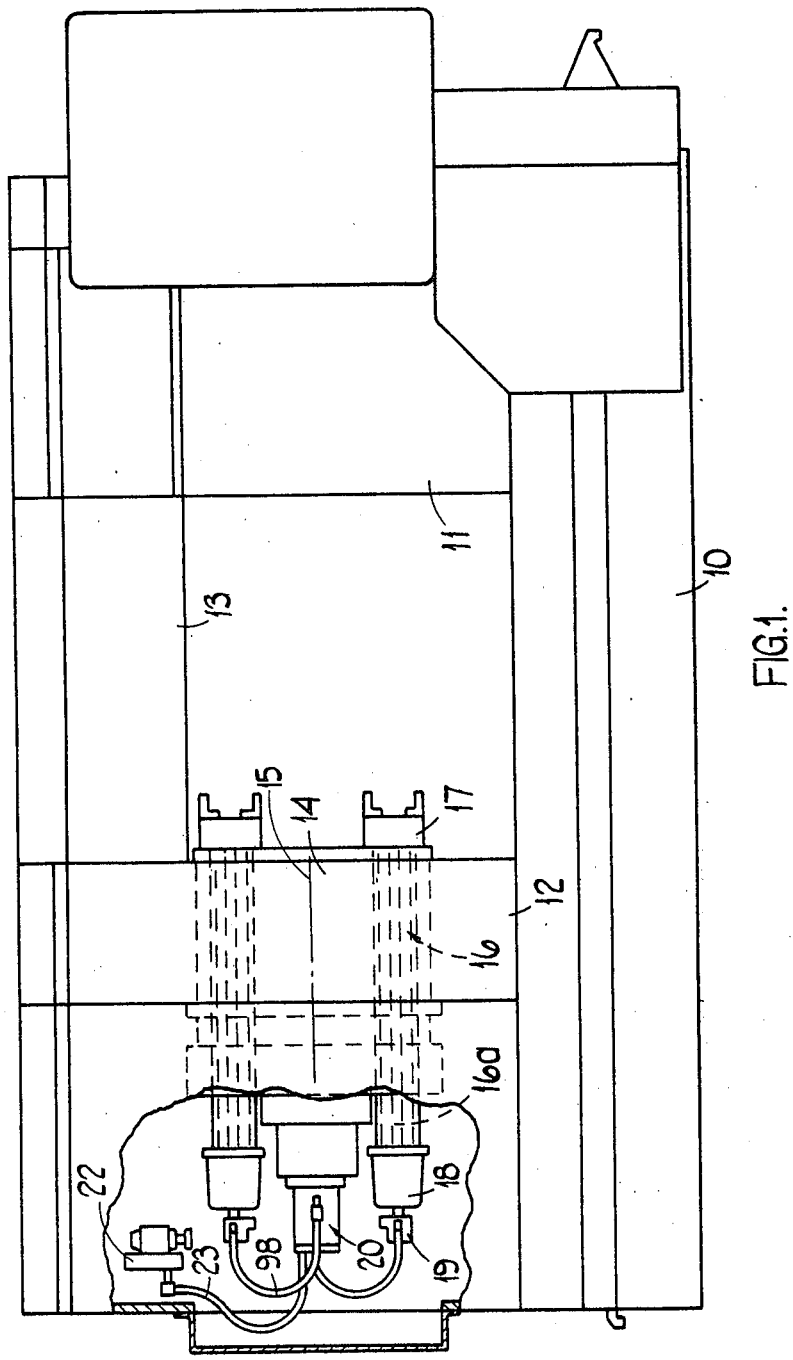

United States Patent [19]

McConnell

[11] 4,011,777

[45] Mar. 15, 1977

[54] MULTI SPINDLE LATHES

[75] Inventor: Edmund Alexander McConnell, Coventry, England

[73] Assignee: Wickman Machine Tool Sales Limited, Coventry, England

[22] Filed: Sept. 8, 1975

[21] Appl. No.: 610,913

[30] Foreign Application Priority Data

Sept. 12, 1974 United Kingdom ............ 39745/74

[52] U.S. Cl. ........................................ 82/3; 82/30; 279/4

[51] Int. Cl.² .................... B23B 3/34; B23B 19/02; B23B 5/22

[58] Field of Search ...................... 82/30, 3, 2, 2.5; 279/4

[56] References Cited

UNITED STATES PATENTS

| | | |
|---|---|---|
| 1,827,485 | 10/1931 | Potter .................................. 279/4 X |
| 1,959,487 | 5/1934 | Mercer .................................. 82/3 |
| 2,473,306 | 6/1949 | Schreiber .............................. 82/3 |
| 2,701,495 | 2/1955 | Staples .................................. 82/3 |
| 2,731,952 | 1/1956 | Szabo .................................. 279/4 X |
| 3,815,929 | 6/1974 | Steinberger et al. ................... 279/4 |

FOREIGN PATENTS OR APPLICATIONS 693,132   7/1940   Germany ................................. 82/3

Primary Examiner—Harrison L. Hinson
Attorney, Agent, or Firm—Finnegan, Henderson, Farabow & Garrett

[57] ABSTRACT

A multi spindle lathe having a number of spindles each with a chuck which is actuated by a fluid pressure operated means, there being control valves for regulating pressure exerted in respective ones of the fluid pressure operated means to allow different gripping forces to be exerted by different chucks.

10 Claims, 5 Drawing Figures

MULTI SPINDLE LATHES

This invention relates to multispindle lathes of the kind having respective workpiece gripping chucks on the spindles of the lathe, these chucks being actuated by fluid pressure. The spindles are rotatably mounted in a drum which is itself indexable between a number of stations to bring workpieces held in the chucks to successive positions at which machining operations may be carried out upon them or in which loading, unloading or reversing can take place. The invention applies to lathes arranged for double indexing as well as those arranged for single indexing, and includes machines having provision for internal or external chuck actuation.

Double indexing involves indexing the drum two stations at a time, thus enabling two sets of components to be produced simultaneously or, where the component is reversed at one of the stations, components may be machined on one side during the first part of the cycle, then reversed and machined on the opposite, previously inaccessible side, during the second part of the cycle, both parts of the cycle running simultaneously.

Because a near fully machined workpiece may be less strong than a partially completed one, and because the machining operations for finishing the workpiece, in general require less force, it may be desirable for gripping loads to vary between one chuck and another on the lathe depending upon their positions at any one time.

It is the object of this invention to provide a multispindle lathe of the kind referred to in which the actuation of chucks on the spindles, allowing workpiece gripping in varying modes, can be achieved.

According to the present invention a multispindle lathe having fluid pressure operated means for actuating chucks on the spindles respectively, is characterised by control means enabling the applied pressures to be varied between respective ones of said pressure operated means.

Figure 2:
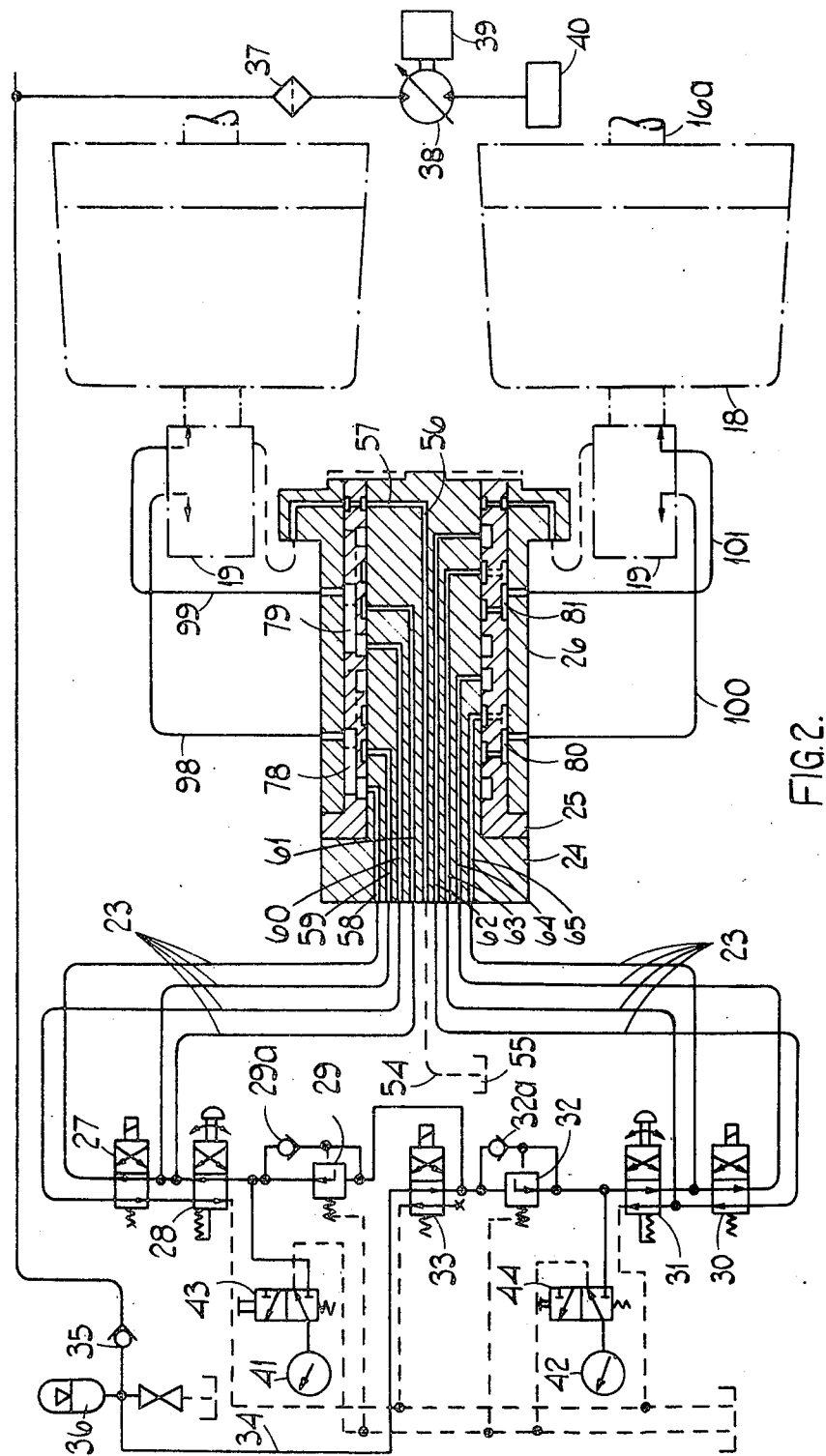
Figure 3:
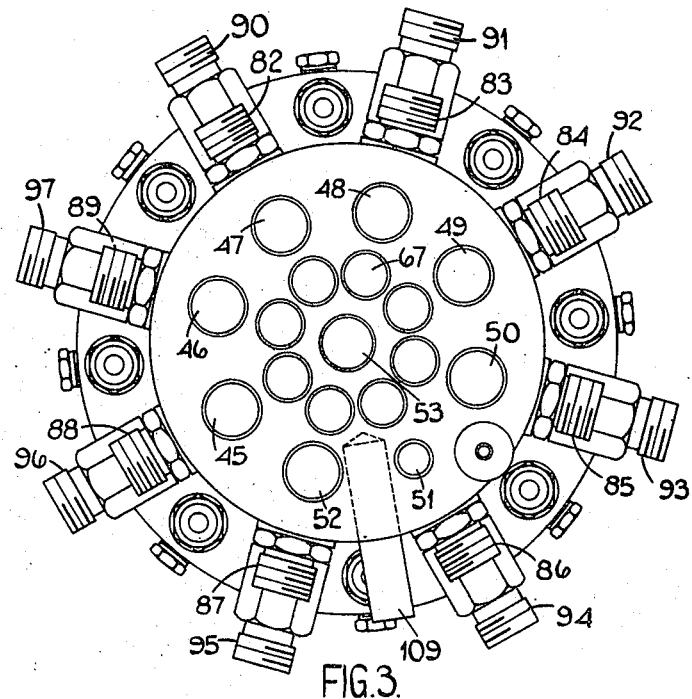
Figure 4:
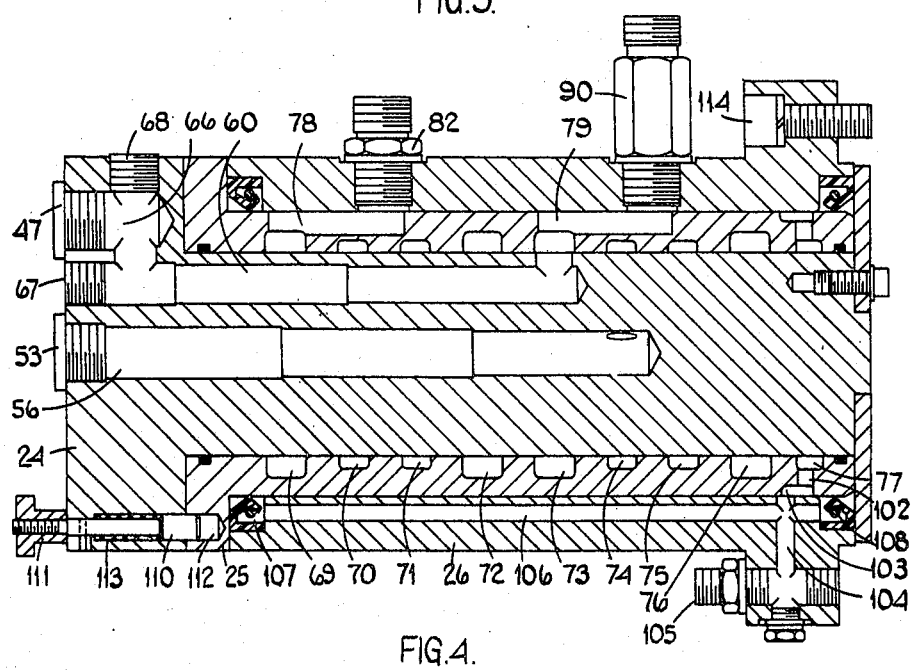
Figure 5:
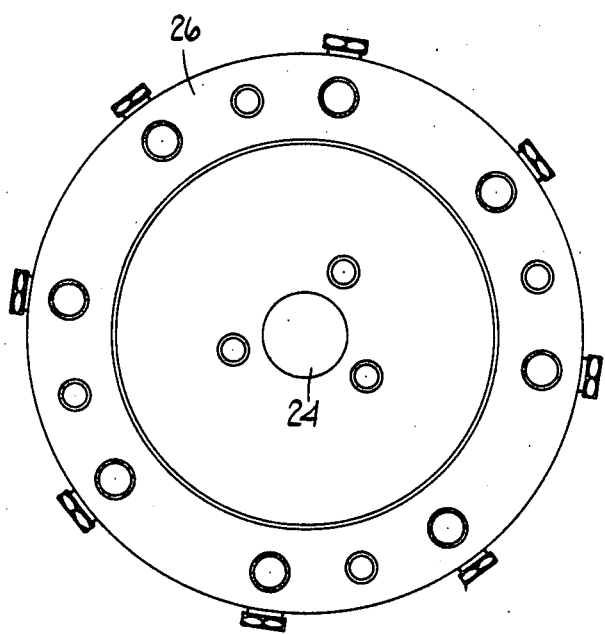

The invention will now be described by way of example with reference to the accompanying drawings in which FIG. 1 is a diagrammatic side elevation view of a multispindle lathe incorporating the present invention, FIG. 2 is a schematic layout of the control means for actuating the chucks of the machine, FIG. 3 is an end elevation view of a fluid distributor forming part of the machine, FIG. 4 is a cross sectional side elevation view of the fluid distributor and, FIG. 5 is a view of the other end of said distributor.

Referring first to FIG. 1 there is shown a multispindle lathe comprising a base 10, on which there are two superstructures 11, 12. These are spaced apart but connected by a bridge structure 13. The space between the superstructures 11 and 12 is occupied by tool slides and other equipment which however is not illustrated for purposes of clarity.

Rotatably mounted about a horizontal axis in the superstructure 12, is a spindle drum 14. The rotational axis is indicated at 15.

Rotatably mounted in the spindle drum 14, are a plurality of parallel spindles indicated generally at 16. These are equi-angularly mounted around the axis 15, and each spindle carries a chuck 17 for gripping a workpiece. Each such chuck 17, is capable of gripping a workpiece either internally or externally.

The chucks 17 are actuated by respective hydraulic cylinders 18. Each such cylinder is connected to the end of a spindle 16, through the hollow interior of which extends a concentric rod 16a. The rod 16a, is connected to axially movable portions of the associated chuck 17. The rod 16a extends right through the cylinder 18 and at its rear end, that is remote from the chuck 17, it carries a rotary coupling 19 whereby hydraulic fluid supply to the cylinder takes place.

The cylinder 18 contains a piston which is fixed on the rod 16a and there are valves within the cylinder and piston assembly preventing release of the gripping pressure applied onto the chuck 17 in the event of failure or removal of the pressure supplied through the rotary coupling 19. The actual form of these cylinders 18 is however no part of the present invention.

In the lathe illustrated, there are eight such spindles 16. The spindle drum 15 is indexable so that the spindles can be indexed between eight stations. Six of the stations are working stations, at which machining operations are carried out and the other two stations are loading, unloading or workpiece reversing stations. In a typical arrangement, station eight is the initial loading station, stations 2, 4 and 6 are working stations, station 7 is a loading station, which receives a component which has been removed and reversed from station 8, so that its previously inaccessible side becomes available for further machining operations which are carried out at stations 1, 3 and 5. The components are ultimately removed from loading station 7. This is the arrangement which will be described though it is to be understood that alternative machining cycles can be accomodated.

As shown in FIG. 1 the cylinders 18 are fed from a distributor 20 mounted at the rear of the spindle drum 14. There are inlet connections on a portion of the distributor which is non-rotatable, these connections being communicating through pipes 23 with a valve assembly indicated generally at 22 and shown in more detail in FIG. 2.

Outlet connections from the distributor 20 communicate through pipes 98 to the rotary couplings 19 and hence to the cylinders 18. That portion of the distributor 20 to which outlet connections are made is indexable with the drum 14. The distributor is therefore mounted co-axially with the drum 14.

The distributor is shown in more detail in FIGS. 3, 4 and 5 and will be referred to later.

Referring now to FIG. 2, the distributor 20 is illustrated. This comprises a core member 24 having a flange on which the inlet connections are made. Surrounding the core member is a flanged sleeve 25, and surrounding this again is a sleeve 26 in which the outlet connections are carried.

The inlet pipes 23 lead to the valve block 22 and a diagrammatic layout of the control valves on this block are shown in FIG. 2. Two groups of such valves are provided. In each of the two groups there are three valves indicated at 27, 28, 29, 30, 31, 32 respectively. These are fed through a further valve 33 which receives a supply of fluid under pressure through an input line 34. This input line, which incorporates a check valve 35, a hydraulic accumulator 36 as well as a filter 37, is supplied from a pump 38, driven by an electric motor 39, drawing the fluid from a reservoir 40.

The blocking valve 33 is actuated by a solenoid which in turn is actuated by a switch and cam or equivalent device on the main camshaft of the machine (not shown). The arrangement is such that the supply line 34 is blocked during indexing so that, in effect, a hydraulic lock is created to prevent fluid at high pressure being supplied through a port in the distributor (to be described) which should be at a low pressure.

When the machine is used in a double indexing mode, which is that described, this prevents inappropriate operation of the chucks as will be described.

The valves 29 and 32 are adjustable to regulate the pressure supplied to respective groups of the chucks and by this means one group of chucks may apply a different gripping force to that applied by the others. Thus, during initial machining operations, when heavy cutting forces are applied a higher gripping force is needed upon the workpiece than is required during the finishing operations which are carried out in the second group of chucks.

The valves 29 and 32 incorporate a pressure return system indicated at 29a and 32a respectively.

Associated with the valve 29 and the valve 32 are respective pressure gauges 41, 42, having associated push button valves 43, 44 whereby pressure existing in the respective flow lines can be monitored.

The valves 28 and 31 are simple change over valves being manually operable. These are used to reverse the flows so that the cylinders 18 may be adjusted for internal or external workpiece gripping modes respectively.

The operating valves 27 and 30 are regulated by respective solenoids which control opening movements of the chucks by means of the cylinders 18. These solenoids are in turn actuated by switch and cam devices or equivalent devices on the main camshaft of the machine (not shown) in accordance with the machine cycle. These valves 27, 30 are spring returned.

As previously described the group of valves 27, 28, 29 supply fluid under pressure to the cylinders for three of the work stations and one of the loading stations. These are identifiable as work stations 2, 4, and 6 and loading station 8.

Similarly the group of valves 30, 31, 32 control the cylinders for the work stations 1, 3, 5 and the loading station 7.

The lines 23 serve to supply fluid to or exhaust fluid from these cylinders through the distributor, those to the work stations being connected between the valves 27, 28 or 30, 31 in the respective groups of valves and those to the load stations being connected downstream of the valve 27 or the valve 30 in the respective groups.

FIGS. 3, 4 and 5 show the distributor. As previously described, the distributor comprises a core member 24 to which all the lines 23 are connected in an end face thereof. This core member is prevented from rotating by means of a torque member (not illustrated) and by the piping formed by the lines 23. As shown in FIGS. 3 and 4 there are nine inlet ports 45 to 53. Eight of these are arranged on a pitch circle about the centre of the distributor at which the ninth port 53 is located.

One of the ports 51 is smaller than the others and is connected through a line 54 (FIG. 2) to a reservoir 55. This is a drain line and in FIG. 2 it is shown connected to a drilling 56 running through the centre of the core member 24 and communicating at its opposite end with a radial drilling 57.

The other eight ports 45 to 50 and 52 and 53 communicate with respective parallel axial drillings 58 to 65 indicated in FIG. 2. Two of these are represented also in FIG. 4. The drillings other than the central one 56 (FIG. 4) communicate with their respective ports through radial connecting bores one of which is shown at 66 in FIG. 4. This arrangement allows sufficient room for access to the nuts in which the ports are formed. To block the ends of the drillings such as the drilling 60 and the radial bore 66 there are core plugs 67, 68 respectively.

At their inner ends each of the bores 58 to 65 have radial communicating bores leading to the cylindrical external surface of the core member 24. Furthermore these are spaced axially as indicated diagrammatically in FIG. 2.

In the sleeve 25 there are nine internal annular grooves spaced equally lengthwise of the sleeve. These grooves are indentified by numerals 69 to 77 respectively. There are nine of these grooves and they communicate with the drillings 56, 58 to 65 respectively through the radial bores associated with the inner ends thereof.

In the external surface of the sleeve 25 there are wider grooves four of which are indicated in FIG. 2 and two of which also appear in FIG. 4. These are indentified by numerals 78 to 81 respectively.

These are arranged to communicate with outlet connectors 82 to 89 and 90 to 97 respectively. These are arranged in two groups arranged at axially spaced positions respectively.

The connectors are joined by lines indicated in FIG. 2 at 98, 99, 100 and 101 to the rotary couplings 19 respectively.

The groove 77 communicates through radial drillings 102 in the sleeve with an external annular groove 103 which in turn communicates with a radial drilling in the external sleeve 26 in which the connectors 82, to 97 are also fitted. This radial drilling 104, communicates with an outlet connector 105, leading to a drain. This is indicated by the line 54 in FIG. 2 which however is illustrated in a different form.

A lengthwise drilling 106 in the external sleeve 26 serves as a drain passage for fluid collected between the two seals 107, 108 at opposite ends of the external sleeve respectively and having edges in running engagement with the external surface of the sleeve 25.

Engaging in the inner core member 24 is a peg 109, to which an external torque bar or other member is connected to prevent rotation of the core member.

The core member 24 and sleeve 25 which surrounds it are normally non-rotatably connected by means of a pin 110, carrying an externally accessible knob 111. This is spring loaded so that its end engages in a short drilling 112, in the sleeve 25 but it can be withdrawn against a compression spring 113 to allow relative adjustment of these parts to clear faults if required.

Bolts 114, serve to connect the outer sleeve 26 to the spindle drum 14.

Further drain lines lead from the connection 105 to the rotary coupling 19 so that fluid from the rotary couplings can be exhausted therethrough and thence to the reservoir 55.

In use, when double indexing operation is carried out, the following sequence takes place. When the machine control initiates an indexing movement, the valve 33 is first closed. This is achieved when indexing commences and serves to block all the lines to the rotary distributor and thence to the cylinders 18 on the respective work spindles. This prevents fluid at high pressure being supplied to a drilling for the time being at low pressure or vice versa.

When indexing is completed, the valve 33 is reopened under the action of its spring to re-establish the pressures in the respective lines to the cylinders 18. The chuck opening solenoid is now actuated, thus actuating the valve 27 or 30 in stations 7 and 8 respectively to enable loading, unloading or reversing to take place.

The valves 28, 29, 31 and 32 are preset to determine the direction of actuation of the chucks and also the pressure levels at the respective groups of chucks. It is to be understood that the pressure may vary between one group of valves and the other and therefore at work stations 1, 3, 5 and 2, 4, 6 respectively, as may the direction of gripping to accomodate different types of components or the same components in different orientation.

With this apparatus it is possible to provide for double indexing or single indexing with either high or low pressure gripping and with the option of internal and external gripping of the components.

However, with single indexing there is no necessity to cut off the pressure by means of the valve 33 during the indexing operation, since the problem of passing a high pressure connection over a low pressure connection or vice versa does not arise.

Internal or external gripping is achieved through the rotary couplings 19 and depends upon which of the two connections to each is at high pressure and which is open to exhaust.

I claim:
1. In a multi-spindle lathe having an indexable drum mounted on a fixed part of the lathe, a plurality of work spindles rotatably mounted in the drum, chucks on the respective spindles, fluid pressure operated piston and cylinder units on the respective spindles to actuate the chucks thereon, the combination comprising:
  a fluid distributor to distribute fluid to and from the respective units to cause actuation of the chucks in predetermined sequence, the distributor having a part fixed to the drum and indexable with it, fluid connections being provided between said part of the distributor and the respective units, the distributor also having a further part non indexable with the drum and secured with respect to a fixed part of the lathe; and
  at least two valves on the fixed part of the lathe, arranged to control flow of fluid to the further part of the distributor and connected thereto by fluid connections, one of the valves being arranged to select the direction of flow of fluid to and from the distributor to actuate the chucks in either of two opposite directions for internal or external gripping, and the other of the valves being arranged to select the pressure of fluid to the units at either of two different fluid pressures, the valves being connected to control a plurality of the units on the respective spindles of the lathe.

2. A multi-spindle lathe as claimed in claim 1 wherein there is at least one further valve for controlling actuation of the units in at least one position of indexing of the drum.

3. A multi-spindle lathe as claimed in claim 1 in which at least two groups of the valves are provided, each group including one direction selecting valve and one pressure selecting valve, each group of valves controlling actuation of a plurality of the units on the spindles of the lathe.

4. A multi-spindle lathe as claimed in claim 3 in which a further valve is provided to block flow of fluid to and from certain of the units during indexing of the drum, and said further valve is connected between said groups of valves.

5. A multi-spindle lathe as claimed in claim 1 wherein the part of the distributor fixed to the drum is an outer part surrounding said part secured to the fixed part of the lathe.

6. In a lathe having a plurality of spindles mounted on an indexable drum for movement between two loading stations and a plurality of working stations, each of said spindles having a chuck controllable through fluid actuation means to grip a workpiece, the combination comprising:
  a distributor for supplying fluid pressure to control said fluid actuation means, said distributor having a movable portion connected to said drum, a stationary portion and fluid connection means coupling said portions;
  control means coupled to said stationary portion of said distributor for controlling the fluid pressure supplied to said fluid actuation means, said control means including a regulating valve for supplying a predetermined level of fluid pressure to control the gripping force of said chucks; and
  said fluid connection means being constructed and arranged to couple said control means to supply said predetermined level of fluid pressure to the fluid actuation means associated with the chucks located at one of said loading stations and at a first group of said working stations and to block the connection between said control means and the fluid actuation means associated with the chucks located at the other of said loading stations and the remaining ones of said working stations.

7. The lathe set forth in claim 6 further comprising:
  reversing valve means included in said control means for selectively controlling the direction of operation of said fluid actuation means whereby said chucks are adapted for internal or external gripping operation.

8. The lathe set forth in claim 6 further comprising:
  operating valve means included in said control means for controlling the opening and closing of said chucks.

9. The lathe set forth in claim 6 further comprising:
  a second regulating valve included in said control means for supplying a second predetermined level of fluid pressure to control the gripping force of said chucks; and
  said fluid connection means being further constructed and arranged to couple said control means to supply said second predetermined level of fluid pressure to the fluid actuation means associated with the chucks located at the other of said loading stations and the remaining ones of said working stations.

10. The lathe set forth in claim 6 further comprising:
  blocking valve means included in said control means for blocking the supply of fluid pressure to said control means during indexing movements of said drum.

* * * * *